US012009724B2

(12) United States Patent
Makino et al.

(10) Patent No.: US 12,009,724 B2
(45) Date of Patent: Jun. 11, 2024

(54) MOTOR AND ROTOR BLADE APPARATUS

(71) Applicant: NIDEC CORPORATION, Kyoto (JP)

(72) Inventors: Yusuke Makino, Kyoto (JP); Daisuke Ogasawara, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 406 days.

(21) Appl. No.: 17/420,141

(22) PCT Filed: Jan. 6, 2020

(86) PCT No.: PCT/JP2020/000011
§ 371 (c)(1),
(2) Date: Jul. 1, 2021

(87) PCT Pub. No.: WO2020/145219
PCT Pub. Date: Jul. 16, 2020

(65) Prior Publication Data
US 2022/0085685 A1    Mar. 17, 2022

(30) Foreign Application Priority Data

Jan. 8, 2019    (JP) ................................. 2019-001083

(51) Int. Cl.
*H02K 5/20*         (2006.01)
*H02K 9/06*         (2006.01)
(Continued)

(52) U.S. Cl.
CPC ............... *H02K 5/207* (2021.01); *H02K 9/06* (2013.01); *H02K 9/223* (2021.01); *H02K 9/227* (2021.01); *H02K 21/22* (2013.01); *H02K 2205/09* (2013.01)

(58) Field of Classification Search
CPC .......... H02K 5/207; H02K 9/227; H02K 9/06; H02K 9/223; H02K 21/22; H02K 2205/09
See application file for complete search history.

(56) References Cited

U.S. PATENT DOCUMENTS

| 8,866,353 B2 | 10/2014 | Miyama et al. |
| 2012/0299407 A1* | 11/2012 | Miyama ................. H02K 11/33 |
| | | 310/63 |
| 2018/0108377 A1* | 4/2018 | Shiraishi .................. H02K 1/30 |

FOREIGN PATENT DOCUMENTS

| JP | S5579652 A | 6/1980 |
| JP | H5104960 A | 4/1993 |

(Continued)

OTHER PUBLICATIONS

International Search Report in PCT/JP2020/000011, dated Mar. 3, 2020. 6pp.

*Primary Examiner* — Jue Zhang
(74) *Attorney, Agent, or Firm* — HAUPTMAN HAM, LLP

(57) ABSTRACT

A motor includes a rotor, a stator, and a support member. The rotor includes a rotor magnet, a magnet holding portion, and spoke portions. The stator includes a plurality of coils and a stator core. The support member includes a stator holding portion and a mount portion. The mount portion includes a plurality of slits extending radially inward from a radially outer end portion of the mount portion. The slits each have openings in an outer circumferential end and an upper surface of the mount portion. The openings of the slits positioned in the upper surface of the mount portion are positioned between the coils adjacent to each other in the circumferential direction when viewed in the axial direction.

13 Claims, 5 Drawing Sheets

(51) Int. Cl.
*H02K 9/22* (2006.01)
*H02K 21/22* (2006.01)

(56) References Cited

FOREIGN PATENT DOCUMENTS

| | | | |
|---|---|---|---|
| JP | 20085617 A | | 1/2008 |
| JP | 201717787 A | | 1/2017 |
| JP | 201898862 A | | 6/2018 |
| JP | 2018098862 A | * | 6/2018 |
| JP | 2018107956 A | * | 7/2018 |
| JP | 2018107956 A | | 7/2018 |

* cited by examiner

MOTOR AND ROTOR BLADE APPARATUS

CROSS-REFERENCE TO RELATED APPLICATIONS

This is the U.S. national stage of application No. PCT/JP2020/000011, filed on Jan. 6, 2020, and priority under 35 U.S.C. § 119(a) and 35 U.S.C. § 365(b) is claimed from Japanese Patent Application No. 2019-001083, filed on Jan. 8, 2019; the disclosures of which are incorporated herein by reference.

FIELD OF THE INVENTION

The present disclosure relates to a motor and a rotor blade apparatus.

BACKGROUND

A high-output motor is required to efficiently radiate heat generated by coils. For example, a configuration of an outer rotor type motor is known in which a bottom portion of the rotor has a blade shape to cause air to flow in the axial direction of the motor.

The outer rotor type motor is attached to a device at a support portion that supports the stator. Depending on the device configuration, the entire lower surface of the support portion of the motor may be closed by the device, and thus cooling may be insufficient in a configuration in which air flows in the axial direction of the motor.

SUMMARY

According to an exemplary embodiment of the present disclosure, there is provided a motor including a rotor that is rotatable about a central axis extending in an up/down direction, a stator positioned radially inside the rotor, and a support member that supports the stator. The rotor includes a rotor magnet radially facing the stator, a magnet holding portion that is annular and holds the rotor magnet, and a plurality of spoke portions radially extending from an upper end portion of the magnet holding portion through an upper side of the stator. The stator includes a plurality of coils and a stator core holding the plurality of coils. The support member includes a stator holding portion extending in an axial direction, and a mount portion extending radially outward from a lower end portion of the stator holding portion through a lower side of the stator. The mount portion includes a plurality of slits extending radially inward from a radially outer end portion of the mount portion. The slits each have openings in an outer circumferential end and an upper surface of the mount portion. The openings of the slits positioned in the upper surface of the mount portion are positioned between the coils adjacent to each other in a circumferential direction when viewed in the axial direction.

The above and other elements, features, steps, characteristics and advantages of the present disclosure will become more apparent from the following detailed description of the preferred embodiments with reference to the attached drawings.

DETAILED DESCRIPTION

A Z-axis direction indicated in each figure is the up/down direction indicating a positive area on the upper side and a negative area on the lower side. The axial direction of a central axis J, which is a virtual axis appropriately illustrated in each drawing, is parallel to the Z-axis direction, that is, the up/down direction. In the following description, unless otherwise noted, a direction parallel to an axial direction of the central axis J is simply referred to by the term "axial direction", "axial", or "axially", radial directions centered on the central axis J are each simply referred to by the term "radial direction", "radial", or "radially", and a circumferential direction about the central axis J is simply referred to by the term "circumferential direction", "circumferential", or "circumferentially".

In the present embodiment, the lower side corresponds to one side in the axial direction, while the upper side corresponds to the other side in the axial direction. Note that the upper side and the lower side are simply terms for describing the relative positional relationship of parts, and the actual arrangement relationship or the like may be an arrangement relationship or the like other than the arrangement relationship or the like indicated by these terms.

Figure 1:
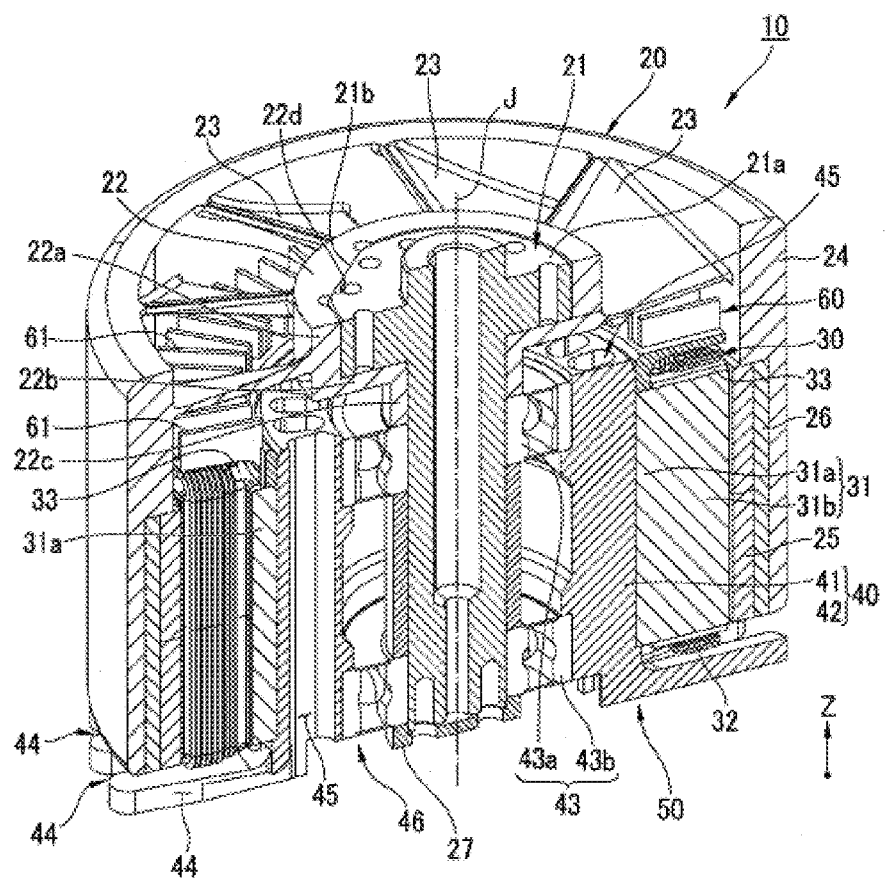
FIG. 1 is a perspective view including a cross section of a motor according to an embodiment.
Figure 2:
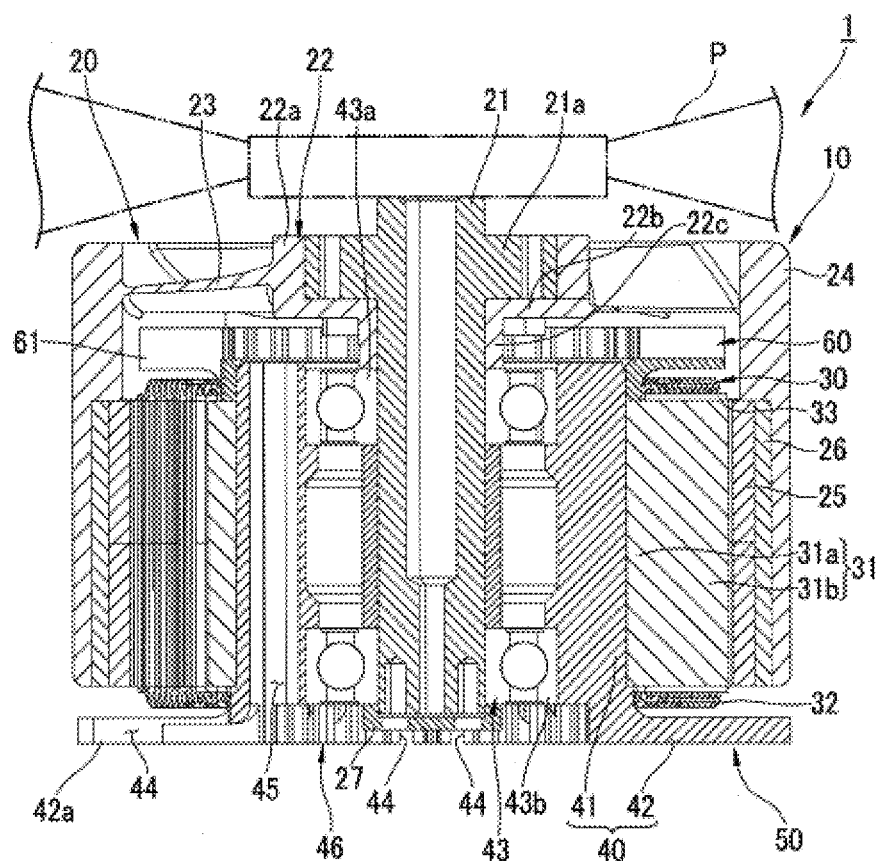
FIG. 2 is a cross-sectional view of the motor according to the embodiment.

As illustrated in FIGS. 1 and 2, a motor 10 of the present embodiment is an outer rotor type motor. The motor 10 includes a rotor 20 and a fixing portion 50. The fixing portion 50 includes a stator 30 and a support member 40 that supports the stator 30. The rotor 20 surrounds the stator 30 from radially outside. That is, the motor 10 includes the stator 30. The stator 30 is positioned radially inside the rotor 20.

The rotor 20 includes a shaft 21, a hub 22, spoke portions 23, a magnet holding portion 24, rotor magnets 25, and a rotor core 26. The rotor 20 is rotatable about the central axis J extending in the up/down direction. The shaft 21 extends in the up/down direction along the central axis J. The shaft 21 includes a disk-shaped flange portion 21a that extends radially around the central axis J at the upper end portion of the shaft 21. The shaft 21 is positioned inside a stator holding portion 41, which will be described below, of the fixing portion 50 and is rotatably supported by a bearing portion 43 about the central axis J.

The hub 22 includes a cylindrical portion 22a extending along the central axis J, a ring-shaped portion 22b extending radially inward from the lower end of the cylindrical portion 22a, and a cylindrical portion 22c extending downward from the inner circumferential end of the ring-shaped portion 22b. The shaft 21 is inserted into the cylindrical portion 22c from the upper side. The flange portion 21a of the shaft 21 is housed in a cup-shaped housing portion including the cylindrical portion 22a and the ring-shaped portion 22b.

As illustrated in FIG. 1, the outer circumferential surface of the flange portion 21a partially includes a flat portion 21b, and the inner circumferential surface of the cylindrical portion 22a partially includes a flat portion 22d. In a state where the flange portion 21a is inserted into the cylindrical portion 22a, the flat portion 21b of the flange portion 21a and the flat portion 22d of the cylindrical portion 22a are arranged to face each other in the radial direction. The fitting between the flat portion 21b and the flat portion 22d stops the rotation of the shaft 21 and the rotor 20 with respect to each other.

The plurality of spoke portions 23 extends radially outward from the outer circumferential surface of the cylindrical portion 22a of the hub 22. The annular magnet holding portion 24 surrounding the stator 30 from the radially outside is disposed radially outside of the plurality of spoke portions 23. The magnet holding portion 24 has a cylindrical shape. The radially outer end portions of the plurality of spoke portions 23 are connected to the inner circumferential surface of the magnet holding portion 24. That is, the spoke portions 23 connect the hub 22 and the magnet holding portion 24 in the radial directions. The spoke portions 23 extend in the radial directions from the upper end portion of the magnet holding portion 24 through the upper side of the stator 30.

In the motor 10, the plurality of spoke portions 23 has an airfoil shape inclined with respect to the axial direction. With this configuration, the rotor 20 including the plurality of spoke portions 23 functions as an axial flow fan that causes air to flow in the axial direction along with rotation. The air blowing direction by the rotor 20 is not particularly limited, and it can be selected from upward or downward depending on the application of the motor 10. In the present embodiment, it is assumed that the air blowing direction of the rotor 20 is upward. Although details will be described below, in the configuration of the rotor blade apparatus in which a propeller P illustrated in FIG. 2 is rotated by the motor 10, a configuration in which air is blown from the motor 10 to the propeller P by the rotor 20 is advantageous in cooling efficiency of the motor 10.

The magnet holding portion 24 extends downward from connection positions with the spoke portions 23 and is positioned radially outside the stator 30. The magnet holding portion 24 holds the rotor magnets 25 and the rotor core 26 at positions radially facing the stator 30. The rotor core 26 is a cylindrical magnetic member extending in the axial direction. The rotor core 26 is fixed to the inner circumferential surface of the magnet holding portion 24. On the inner circumferential surface of the rotor core 26, the plurality of rotor magnets 25 is arranged along the circumferential direction. The rotor magnets 25 are adhered to the inner circumferential surface of the rotor core 26. The rotor magnets 25 may be a ring magnet extending in the circumferential direction.

The support member 40 includes a stator holding portion 41 and a mount portion 42. The stator holding portion 41 is a cylindrical member extending in the axial direction Z. The bearing portion 43 is held on the inner circumferential surface of the stator holding portion 41. In the present embodiment, the bearing portion 43 includes two ball bearings 43a and 43b. The ball bearing 43a is held at the upper end portion of the inner circumferential surface of the stator holding portion 41. The ball bearing 43b is held at the lower end portion of the inner circumferential surface. The inner rings of the ball bearings 43a and 43b support the shaft 21 of the rotor 20. To the lower end of the shaft 21, an end cover 27 for retaining the shaft is screwed. As the bearing portion 43, a slide bearing may be used.

On the outer circumferential surface of the stator holding portion 41, the stator 30 having a ring shape is held. The stator 30 includes a plurality of coils 32 and a stator core 31 fixed to the stator holding portion 41. The stator core 31 holds the plurality of coils 32. The stator core 31 includes a cylindrical core back 31a surrounding the stator holding portion 41 from the radially outside, and a plurality of rectangular parallelepiped teeth 31b extending radially outward from the outer circumferential surface of the core back 31a. The coils 32 are wound around the teeth 31b via insulators 33 made of resin molded bodies or the like.

The mount portion 42 extends radially outward from the lower end portion of the stator holding portion 41 through the lower side of the stator 30. The mount portion 42 has a plurality of slits 44 extending radially inward from the radially outer end portion of the mount portion 42. The plurality of slits 44 is arranged at equal intervals in the circumferential direction.

The mount portion 42 has a recessed portion 46 recessed upward at the center of the lower surface. The recessed portion 46 has a circular shape when viewed from below. The plurality of slits 44 penetrates the mount portion 42 in the radial directions. The radially outer ends of the slits 44 open radially outward from the outer circumferential end portion of the mount portion 42. The radially inner end portions of the slits 44 open into the recessed portion 46. In the recessed portion 46, the end cover 27 at the lower end of the shaft 21 is accommodated. Since the end cover 27 does not project below the lower surface of the mount portion 42, the motor 10 can be installed on a flat surface of a device.

The slits 44 open on both the upper surface and the lower surface of the mount portion 42. The openings of the slits 44 in the upper surface of the mount portion 42 extend radially inward from the outer circumferential end of the mount portion 42 and substantially reach the outer circumferential surface of the stator holding portion 41. The openings of the slits 44 in the lower surface of the mount portion 42 extend radially inward from the outer circumferential end of the mount portion 42 and are connected to the openings facing the lower side of the recessed portion 46. The slits 44 each have openings in the outer circumferential end and the upper surface of the mount portion 42.

Figure 3:
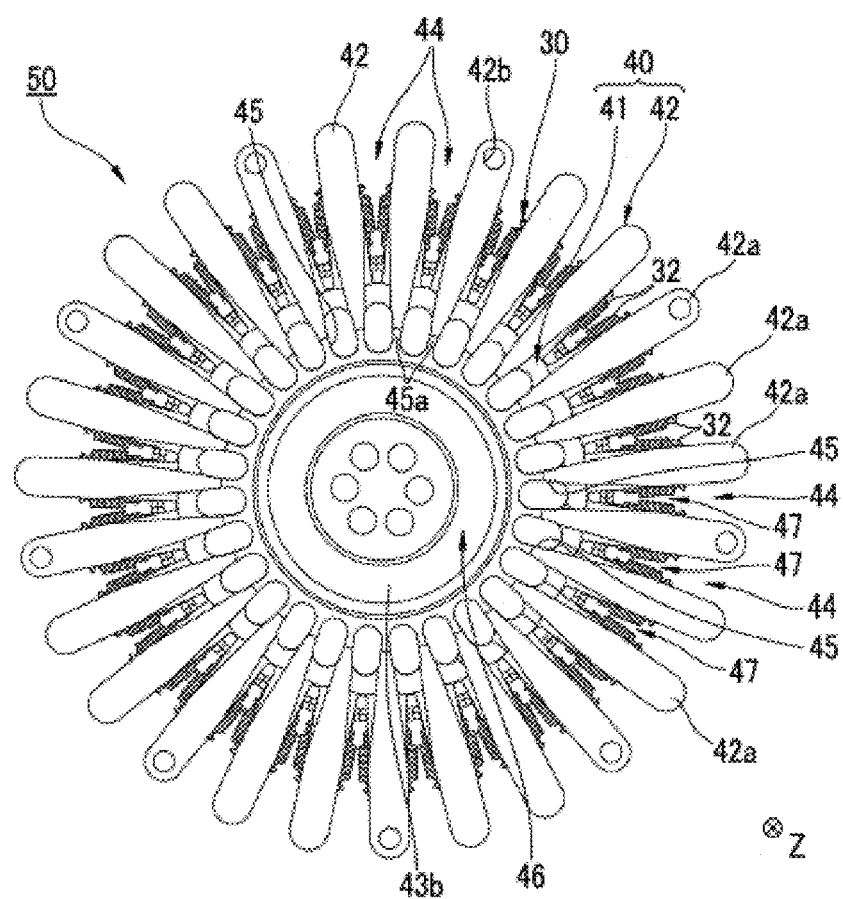
FIG. 3 is a plan view of a stator and a support member when viewed from below.

As illustrated in FIGS. 1 to 3, the mount portion 42 is divided into a plurality of leg portions 42a extending radially by the slits 44 in a region outer than the stator holding portion 41. The plurality of leg portions 42a is arranged at equal intervals in the circumferential direction. The mount portion 42 has as many leg portions 42a as the coils 32 of the stator 30. Each of the leg portions 42a is disposed below the corresponding coil 32. That is, the leg portions 42a overlap the coils 32 and the teeth 31b when viewed in the axial direction.

As illustrated in FIG. 3, a part of leg portions 42a of the mount portion 42 have through-holes 42b penetrating the leg portions 42a in the axial direction. The leg portion 42a having the through-holes 42b is provided as one out of every three of the plurality of leg portions 42a arranged in the circumferential direction. Each of the through-holes 42b may have a female screw on the inner circumferential surface. The motor 10 can be fastened to the device using the through-holes 42b.

In the motor 10 of the present embodiment, the plurality of slits 44 is positioned between the coils 32 adjacent in the circumferential direction as illustrated in FIG. 3. That is, the openings of the slits 44 positioned in the upper surface of the mount portion 42 are positioned between the coils 32 adjacent in the circumferential direction when viewed in the axial direction. The plurality of slits 44 opens to the outer circumferential end, the upper surface, and the lower surface of the mount portion 42. According to this configuration, by blowing air to the upper side by the rotor 20 functioning as an axial flow fan, it is possible to suction air through the openings of the slits 44 facing the radially outer side and causes the air to flow from the upper-side openings of the slits 44 to the gaps between the coils 32. The air having flowed through the gaps between the coils 32 is discharged to the upper side of the motor 10 through the gaps between the spoke portions 23 of the rotor 20. According to the motor 10, the coils 32 of the stator 30, which are the heat source, can be efficiently cooled.

In a case where a device is disposed below the mount portion 42 in the motor 10, the lower-side openings of the plurality of slits 44 may be closed by the device. Even in such a case, since the slits 44 open to the outer circumferential end and the upper surface of the mount portion 42, air can be suctioned into the motor 10 through the slits 44 and discharged to the upper side of the motor 10, and thus the coils 32 can be sufficiently cooled.

In the present embodiment, the slits 44 each have openings extending radially inward from the outer circumferential end of the mount portion 42 in the upper surface and the lower surface of the mount portion 42. Therefore, when the lower surface of the mount portion 42 is not closed by the device, air is delivered to the coils 32 through the slits 44 in the up/down direction, so that higher cooling performance can be achieved.

In the motor 10, the outer circumferential end of the mount portion 42 is positioned below the magnet holding portion 24. More specifically, the end portions of the leg portions 42a at the radially outer end and the outer circumferential end of the rotor 20 coincide in radial position when viewed in the axial direction. According to this configuration, the outer diameter of the mount portion 42 can be maximized without increasing the outer diameter of the motor 10. Thus, the heat dissipation performance of the mount portion 42 can be enhanced.

In the motor 10, the support member 40 is a single member. That is, the stator holding portion 41 and the mount portion 42 are parts of a single member. According to this configuration, the heat transferred from the stator core 31 to the stator holding portion 41 can be smoothly transferred to the mount portion 42, and the heat of the coils 32 can be efficiently dissipated.

Figure 5:
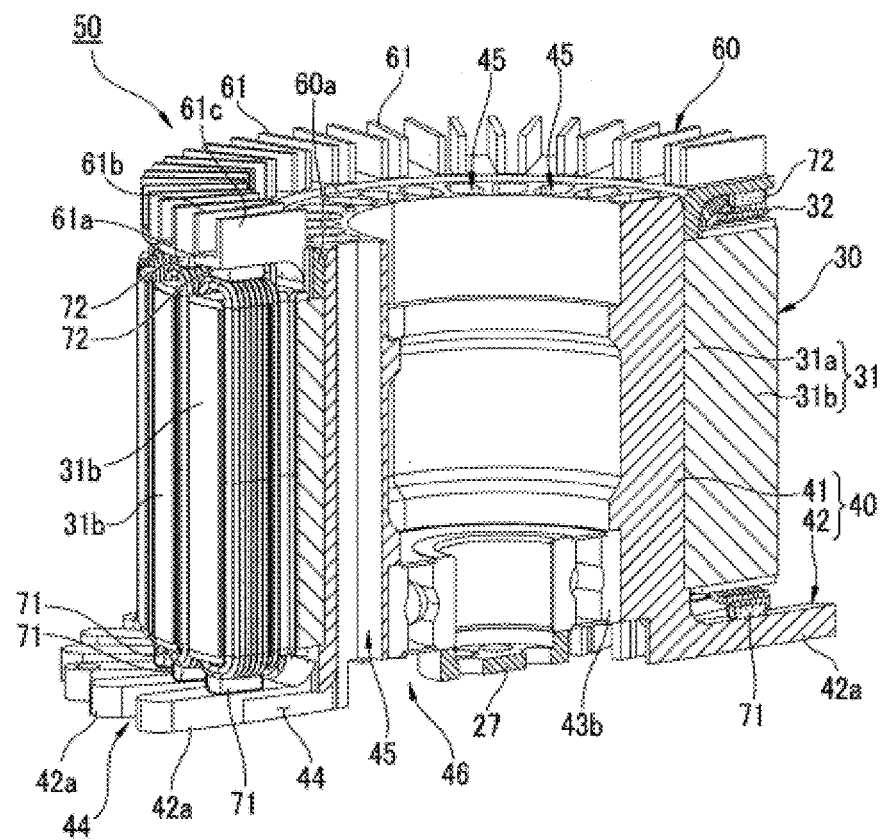
FIG. 5 is a perspective view including a cross section of the stator and the support member.

As illustrated in FIG. 5, the motor 10 may include heat transfer members 71 that thermally connect the upper surface of the mount portion 42 and the lower surfaces of the coils 32. According to this configuration, the heat of the coils 32 is directly transferred to the mount portion 42, and thus the heat dissipation from the mount portion 42 is facilitated. Since the heat transfer members 71 are disposed between the leg portions 42a and the coils 32 that overlap when viewed in the axial direction, the heat transfer members 71 do not block the vent paths between the adjacent coils 32.

By providing the heat transfer members 71, even when the stator holding portion 41 and the mount portion 42 are formed of separate members, cooling is possible using the mount portion 42. For the heat transfer members 71, it is preferable to use a resin material having a high thermal conductivity. For the heat transfer members 71, a resin material having an excellent thermal conductivity belonging to a silicone resin, an epoxy resin, a polyamide resin, a polyphenylene sulfide resin, or the like can be used.

The stator holding portion 41 has a plurality of vent holes 45 penetrating the stator holding portion 41 in the axial direction. That is, the support member 40 has the plurality of vent holes 45 penetrating the support member 40 in the axial direction. According to the above-described configuration, the heat transferred from the stator 30 to the stator holding portion 41 can be dissipated to the air flowing through the vent holes 45, and can be further radiated to the upper side of the motor 10 by the rotor 20. According to the motor 10, the stator 30 can be efficiently cooled.

Upper end portions of the vent holes 45 open to the upper end surface of the cylindrical stator holding portion 41. The lower end portions of the vent holes 45 open into the recessed portion 46 in the lower surface of the mount portion 42. Since the slits 44 radially penetrate the mount portion 42 and open into the recessed portion 46, the slits 44 and the vent holes 45 are connected through the recessed portion 46. That is, the vent holes 45 are connected to the slits 44 via the recessed portion 46 which is an additional vent path.

With the above-described configuration, the air can flow from the slits 44 to the upper side of the stator 30 through the vent holes 45. By causing air to flow through the stator holding portion 41 positioned radially inside the stator core 31, heat transferred from the stator 30 to the stator holding portion 41 can be efficiently dissipated.

In the present embodiment, as illustrated in FIGS. 1 to 3, the lower-side opening of one of the vent holes 45 is positioned at the radially inner end portion of one of the slits 44. According to this configuration, the slits 44 and the vent holes 45 are directly connected, so that the air flowing into the motor 10 through the slits 44 can be smoothly delivered to the vent holes 45. As a result, high cooling efficiency can be achieved.

The plurality of vent holes 45 is arranged along the circumferential direction of the stator holding portion 41 when viewed in the axial direction. The plurality of vent holes 45 is arranged at equal intervals in the circumferential direction. The motor 10 has as many vent holes 45 as the teeth 31b. Since the stator holding portion 41 has the plurality of vent holes 45 arranged in the circumferential direction, the surface area of the stator holding portion 41 can be increased, and then the cooling performance of the stator holding portion 41 can be enhanced.

Figure 4:
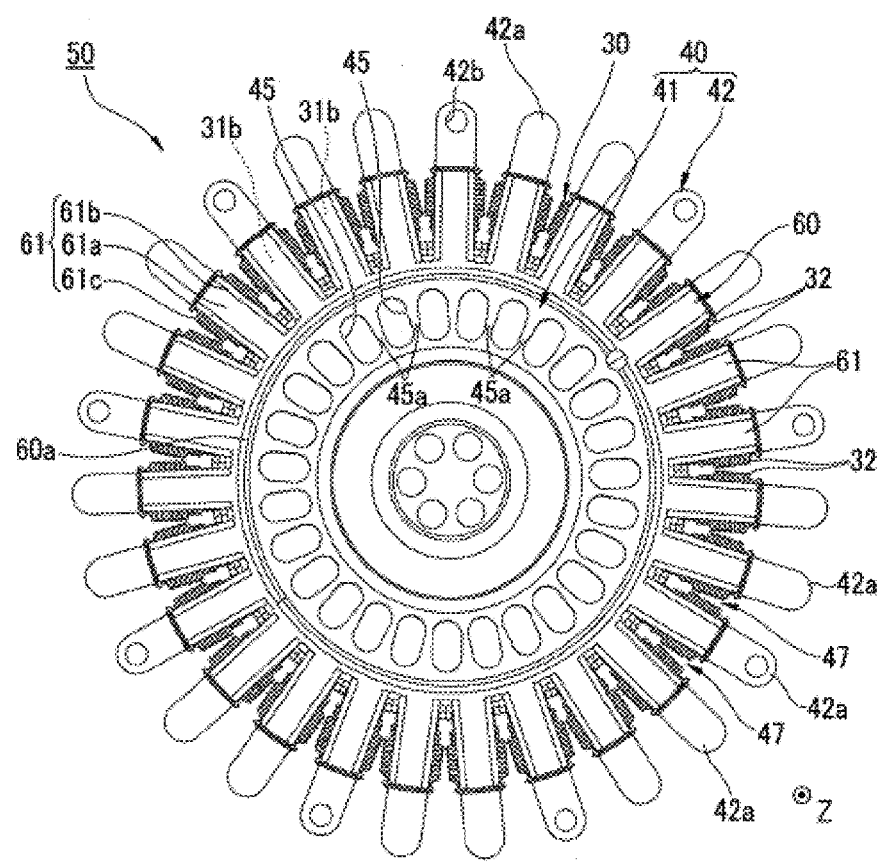
FIG. 4 is a plan view of the stator and the support member when viewed from above.

As illustrated in FIG. 4, each of the vent holes 45 is positioned radially inside an area between adjacent ones of the teeth 31b in the circumferential direction. On the radially inner side of each of the teeth 31b, a partition wall 45a that partitions ones of the vent holes 45 adjacent to each other in the circumferential direction is disposed. The stator holding portion 41 has the partition walls 45a positioned between the vent holes 45 adjacent in the circumferential direction when viewed in the axial direction.

In the stator holding portion 41, the plurality of partition walls 45a extends in the radial directions. The cylindrical portion on the radially outer side of the stator holding portion 41 and the cylindrical portion on the radially inner side of the stator holding portion 41 are connected by the plurality of partition walls 45a. The heat transferred from the coils 32 to the stator holding portion 41 via the teeth 31b is also transferred to the radially inner side of the stator holding portion 41 through the partition walls 45a. As a result, heat is transferred to the entire inner peripheral wall of vent holes 45, so that heat dissipation to the air flowing through the vent holes 45 is further facilitated.

The partition walls 45a is positioned radially inside the teeth 31b of the stator core 31. With this configuration, the heat of the teeth 31b is efficiently transferred to the radially inner side of the stator holding portion 41 through the partition walls 45a. As a result, cooling of the coils 32 is facilitated.

The cross-sectional shape of the vent holes 45 in a cross section perpendicular to the axial direction is a racetrack shape. That is, the cross-sectional shape of the vent holes 45 is a shape formed by two arc portions disposed apart from each other in a radial direction and connected to each other by two straight line portions. The cross-sectional shape of the vent holes 45 is not particularly limited, and may be a circle, an ellipse, a polygon, or the like.

The vent holes 45 have a uniform shape in the axial direction. That is, the cross-sectional area of the vent holes 45 in the cross section perpendicular to the axial direction is constant along the axial direction. According to this configuration, the area of the inner circumferential surfaces of the vent holes 45 can be easily maximized, and the contact area between the air flowing in the vent holes 45 and the stator holding portion 41 can be increased, so that high cooling efficiency can be achieved. Note that the vent holes 45 may have a shape that changes the cross-sectional areas thereof toward one sides in the axial direction.

As illustrated in FIG. 5, the fixing portion 50 includes, on the upper side of the stator 30, a heat sink 60 having a substantially ring shape when viewed in the axial direction. The heat sink 60 is fixed to a portion of the stator holding portion 41 projecting above the stator 30. The heat sink 60 is disposed in an axial gap between the stator 30 and the spoke portions 23. By providing the heat sink 60, the heat of the coils 32 can be transferred to the heat sink 60 through the stator holding portion 41 and dissipated.

The heat sink 60 includes a cylindrical portion 60a extending along the outer circumferential surface of the stator holding portion 41 and a plurality of heat dissipation portions 61 extending radially outward from the outer circumferential surface of the cylindrical portion 60a. The cylindrical portion 60a is disposed in contact with the outer circumferential surface of the stator holding portion 41. The heat sink 60 is thermally connected to the stator holding portion 41 via the cylindrical portion 60a.

As illustrated in FIG. 5, the heat dissipation portions 61 each have a configuration in which three plate portions are arranged in a U shape when viewed in the radial direction. The heat dissipation portions 61 each includes a lower plate portion 61a having plate surfaces facing up and down and extending in the radial direction, and two standing plate portions 61b and 61c extending upward from both ends, in the circumferential direction, of the lower plate portion 61a. With this configuration, the surface area of the heat dissipation portions 61 can be increased, and the heat dissipation efficiency of the heat sink 60 can be enhanced.

As illustrated in FIG. 4, the plurality of heat dissipation portions 61 is arranged at equal intervals in the circumferential direction. The heat sink 60 includes the plurality of heat dissipation portions 61 arranged along the circumferential direction. The gaps between the heat dissipation portions 61 adjacent to each other in the circumferential direction are positioned between the coils 32 adjacent to each other in the circumferential direction when viewed in the axial direction. According to this configuration, the heat sink 60 does not block the wind flowing between the coils 32, so that the air can smoothly flow in the axial direction of the motor 10, and the heat in the motor 10 can be efficiently radiated to the outside.

As illustrated in FIG. 5, the motor 10 may include heat transfer members 72 that thermally connect the lower surfaces of the heat dissipation portions 61 and the lower surfaces of the coils 32. According to this configuration, the heat of the coils 32 is directly transferred to the heat dissipation portions 61, so that the heat dissipation from the heat sink 60 is facilitated. The heat transfer members 72 are disposed between the heat dissipation portions 61 and the coils 32 that overlap each other when viewed in the axial direction. The vent paths between the heat dissipation portions 61 are not narrowed by the heat transfer members 72.

For the heat transfer members 72, it is preferable to use a resin material having a high thermal conductivity. For the heat transfer members 71, a resin material having an excellent thermal conductivity belonging to a silicone resin, an epoxy resin, a polyamide resin, a polyphenylene sulfide resin, or the like can be used.

As illustrated in FIG. 2, a rotor blade apparatus 1 can be formed by connecting the propeller P to the motor 10 of the present embodiment at the upper end of the shaft 21. The rotor blade apparatus 1 includes the motor 10 and the propeller P. The propeller P is connected to the rotor 20 of the motor 10. In the rotor blade apparatus 1, the motor 10 rotates the propeller P and blows the air inside the motor 10 upward by the rotor 20 functioning as an axial flow fan. The motor 10 suctions the relatively low-temperature air, which is delivered downward by the propeller P, radially inward through the slits 44. The air suctioned into the motor 10 absorbs the heat of the fixing portion 50 while flowing through the gaps between the coils 32 and through the vent holes 45, and is discharged upward from the gaps between the spoke portions 23. The rotor blade apparatus 1 can rotate the propeller P while cooling the motor 10.

In the rotor blade apparatus 1, the motor 10 is preferably configured to blow air from the lower side to the upper side by the rotor 20. On the outer circumferential surface of the motor 10 where the slits 44 open, the air pressure is high due to the wind caused by the propeller P, so that the air is easily suctioned to the inside of the motor 10 through the slits 44. In addition, since the heat of the stator 30 can be caused to flow upward without resisting convection, the heat dissipated to the air is less likely to return to the stator 30, so that high cooling efficiency can be achieved.

The present disclosure is not limited to the above-described embodiment, and other structures may be adopted in other embodiments of the present disclosure. Although the motor 10 of the present embodiment is configured to include the vent holes 45 penetrating the stator holding portion 41 in the axial direction, a gap may be provided between the inner circumferential surface of the stator holding portion 41 and the outer circumferential surfaces of the ball bearings 43a and 43b. According to this configuration, the air flowing into the recessed portion 46 through the slits 44 can flow from the recessed portion 46 to the upper surface of the stator 30 through the gap between the stator holding portion 41 and the ball bearings 43a and 43b. Accordingly, heat can be dissipated from the inner circumferential surface of the stator holding portion 41 and the ball bearings 43a and 43b to cool the stator 30.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:
1. A motor comprising:
a rotor that is rotatable about a central axis extending in an up/down direction;
a stator positioned radially inside the rotor;
a support member that supports the stator, wherein
the rotor includes a rotor magnet radially facing the stator, a magnet holding portion that is annular and holds the rotor magnet, and a plurality of spoke portions radially extending from an upper end portion of the magnet holding portion through an upper side of the stator, the stator includes a plurality of coils and a stator core holding the plurality of coils, the support member includes a stator holding portion extending in an axial direction, and a mount portion extending radially outward from a lower end portion of the stator holding portion through a lower side of the stator, the mount portion includes a plurality of slits extending radially inward from a radially outer end portion of the mount portion, the slits each have openings in an outer circumferential end and an upper surface of the mount portion, and the openings of the slits positioned in the upper surface of the mount portion are positioned between the coils adjacent to each other in a circumferential direction when viewed in the axial direction; and a heat sink disposed in an axial gap between the stator and the spoke portions, wherein the heat sink includes a plurality of heat dissipation portions arranged along the circumferential direction, and gaps between the heat dissipation portions adjacent to each other in the circumferential direction are positioned between the coils adjacent to each other in the circumferential direction when viewed in the axial direction.

2. The motor according to claim 1, wherein the support member includes a vent hole axially penetrating the support member, and the vent hole is connected to the slits directly or through an additional vent path.

3. The motor according to claim 2, wherein the vent hole penetrates the stator holding portion in the axial direction.

4. The motor according to claim 3, wherein a plurality of the vent holes is arranged along a circumferential direction of the stator holding portion when viewed in the axial direction.

5. The motor according to claim 4, wherein the stator holding portion includes partition walls positioned between the vent holes adjacent to each other in the circumferential direction when viewed in the axial direction, and the partition walls are positioned radially inside the teeth of the stator core.

6. The motor according to claim 3, wherein at radially inner end portions of the slits, lower-side openings of the vent holes are positioned.

7. The motor according to claim 1, wherein the slits each have openings extending radially inward from the outer circumferential end of the mount portion in the upper surface and a lower surface of the mount portion.

8. The motor according to claim 1 further comprising a heat transfer member that thermally connects the upper surface of the mount portion and lower surfaces of the coils.

9. The motor according to claim 1, wherein the outer circumferential end of the mount portion is positioned below the magnet holding portion.

10. The motor according to claim 1, wherein the stator holding portion and the mount portion are parts of a single member.

11. The motor according to claim 1, further comprising a heat transfer member that thermally connects lower surfaces of the heat dissipation portions and upper surfaces of the coils.

12. The motor according to claim 1, wherein the spoke portions have an airfoil shape inclined with respect to the axial direction.

13. A rotor blade apparatus comprising:
the motor according to claim 1; and
a propeller connected to the rotor of the motor.

* * * * *